United States Patent [19]
Hiroi

[11] Patent Number: 5,195,028
[45] Date of Patent: Mar. 16, 1993

[54] TWO DEGREE OF FREEDOM CONTROLLER

[75] Inventor: Kazuo Hiroi, Tokyo, Japan

[73] Assignee: Kabushiki Kaisha Toshiba, Kawasaki, Japan

[21] Appl. No.: 684,181

[22] Filed: Apr. 12, 1991

[30] Foreign Application Priority Data

Apr. 18, 1990 [JP] Japan ................... 2-102632

[51] Int. Cl.$^5$ ............................................. G05B 13/00
[52] U.S. Cl. ................................. 364/161; 364/162; 364/176; 364/177; 318/609
[58] Field of Search ................. 364/148, 152, 157–165, 364/176, 177; 318/561, 609, 610, 632, 615

[56] References Cited

U.S. PATENT DOCUMENTS

| 4,719,561 | 1/1988 | Shigemasa | 364/162 |
| 4,755,924 | 7/1988 | Hiroi | 364/162 X |
| 5,059,880 | 10/1991 | Hiroi | 364/161 X |

FOREIGN PATENT DOCUMENTS

| 0192245 | 8/1986 | European Pat. Off. |
| 0333477 | 9/1989 | European Pat. Off. |
| 2914732 | 1/1979 | Fed. Rep. of Germany |

OTHER PUBLICATIONS

Patent Abstracts of Japan, vol. 12, No. 259; Yokogawa Electric Corp.; 21 Jul. 1988 (JP-A-63 46502).
Patent Abstracts of Japan, vol. 12, No. 259; Yokogawa Electric Corp.; 21 Jul. 1988 (JP-A-63 46503).
Patent Abstracts of Japan, vol. 7, No. 168; Tokyo Shibaura Denki K.K.; 23 Jul. 1983 (JP-A-58 75207).

Primary Examiner—Joseph Ruggiero
Attorney, Agent, or Firm—Oblon, Spivak, McClelland, Maier & Neustadt

[57] ABSTRACT

A PI type 2DOF controller comprises setpoint filter for receiving a setpoint value, and outputting a control setpoint value, the setpoint filter having a transfer function which follows the setpoint value, and is expressed by the following formula:

$$\frac{1 + \alpha\beta T_I \cdot S}{1 + \beta T_I \cdot S}$$

where $T_I$: an integral time, $S$: a Laplace operator, $\alpha$: a constant which can be set between 0 and 1, and $\beta$: a constant which can be set between 0 and about 10, deviation-calculating portion for calculating a deviation between the control setpoint value and a control value fed back from a controlled system, control operation portion for receiving the deviation, executing at least a PI (P: proportional, I: integral) control operation, and outputting a manipulative variable, and applying portion for applying the manipulative variable to the controlled system.

14 Claims, 9 Drawing Sheets

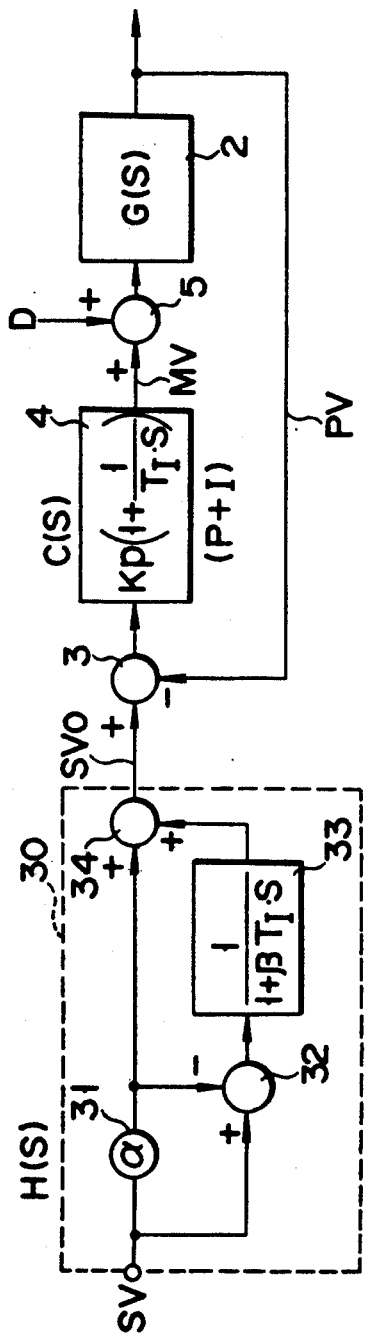
F I G. 6
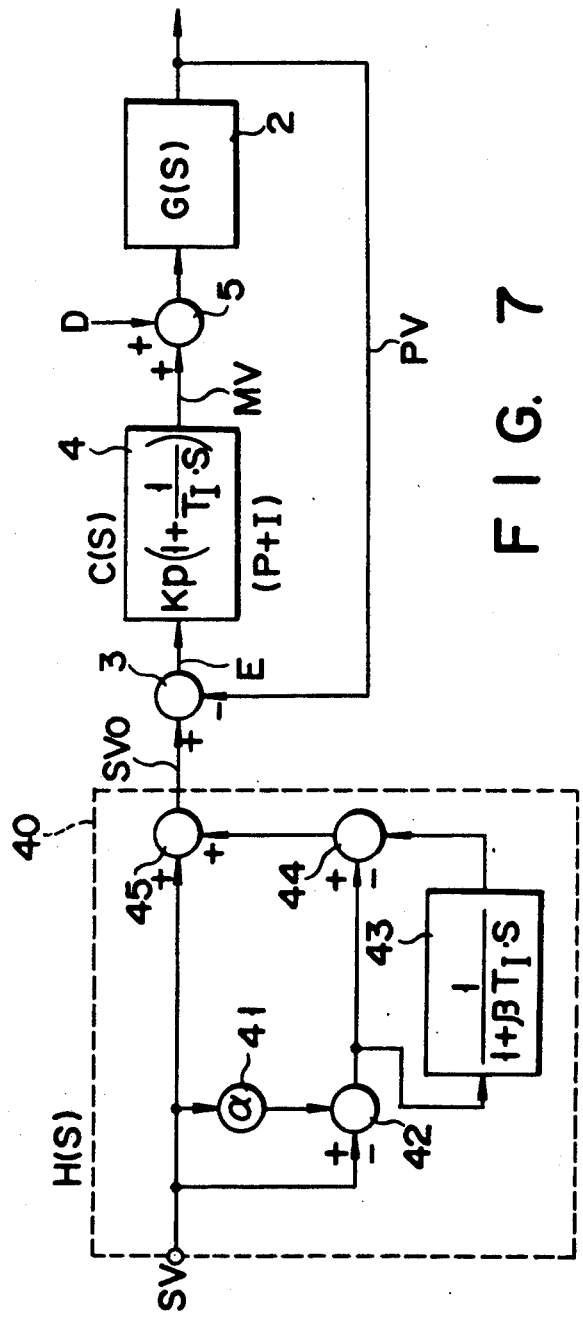
F I G. 7

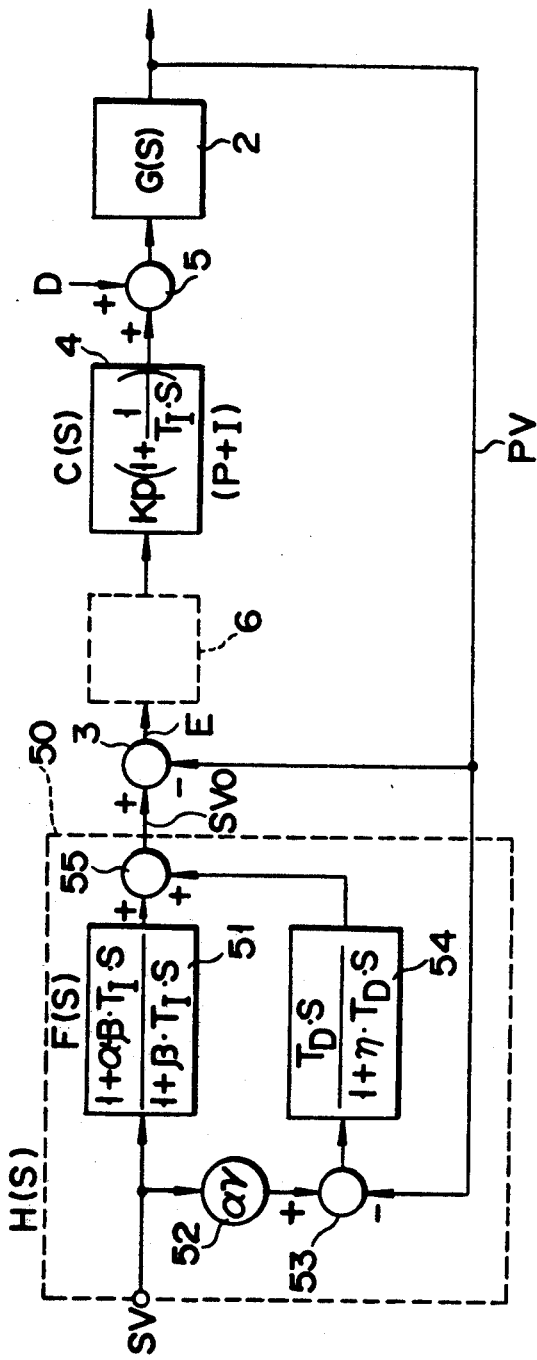
F I G. 8
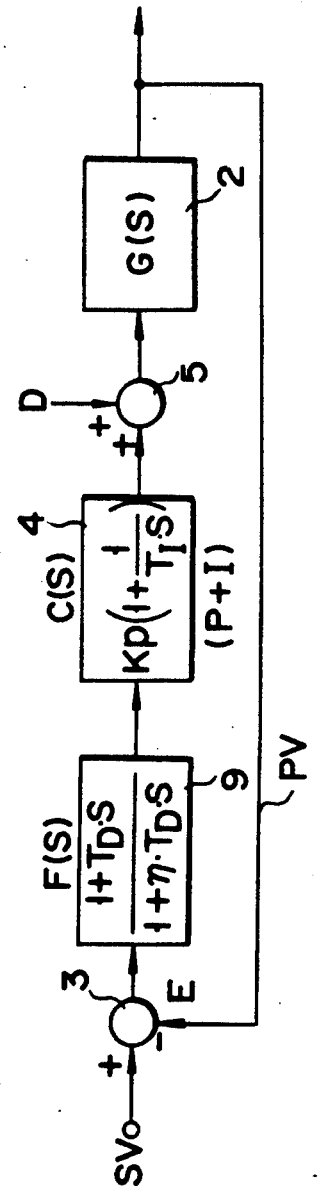
F I G. 9

TWO DEGREE OF FREEDOM CONTROLLER

BACKGROUND OF THE INVENTION

1. Field of the Invention

The present invention relates to a controller for feedback-controlling a controlled system by PI or PID (P: proportional, I: integral, D: derivative) operations and, more particularly, to a two degrees of freedom controller for realizing two degrees of freedom (2DOF) control for simultaneously optimizing a process-disturbance control characteristic and a setpoint-following characteristic using functional blocks having a mimimum time element.

2. Description of the Related Art

A conventional 2DOF PI controller is disclosed in U.S. Pat. No. 4,755,924, and has a setpoint filter 1 which follows a change in setpoint value, as shown in FIG. 1, thereby performing 2DOF PI control. More specifically, the setpoint filter 1 receives a setpoint value SV, executes calculation processing for 2DOF-controlling a proportional gain and an integral time, and outputs a control setpoint value $SV_0$. The control setpoint value $SV_0$ obtained from the setpoint filter 1 and a control value PV from a controlled system 2 are supplied to a deviation-calculating means 3, and are subjected to a calculation ($SV_0-PV$), thereby obtaining a deviation E. Thereafter, the deviation E is supplied to a PI control operation means 4 expressed by a transfer function $K_P\{1+1/(T_I\cdot S)\}$ (where $K_P$ is the proportional gain, $T_I$ is the integral time, and S is the Laplace operator). The PI control operation means 4 executes a PI control operation on the basis of the transfer function, and a calculated manipulative variable MV is supplied to an addition means 5. The manipulative variable MV and a disturbance signal D are added to each other by the means 5, and the sum is applied to the controlled system 2 to control the system 2 so that the setpoint value $SV_0$=the control value PV.

The setpoint filter 1 comprises a lead/lag means $1_1$, a 1st lag means $1_2$, an incomplete derivative means $1_3$, and a subtraction means $1_4$. The lead/lag means $1_1$ has a function of adjusting a compensation timing by a desired lead or lag time in consideration of a process time constant upon reception of the setpoint value SV. The 1st lag means $1_2$ has a function of providing a 1st lag upon reception of the setpoint value SV. The incomplete derivative means $1_3$ performs an incomplete derivative upon reception of an output from the 1st lag means $1_2$. The subtraction means $1_4$ subtracts an output from the incomplete derivative means $1_3$ from an output from the lead/lag means $1_1$.

Therefore, according to this arrangement of the setpoint filter 1, a transfer function $C_{PV}(S)$ between PV→MV is given by:

$$C_{PV}(S) = \frac{-MV}{PV} = K_P\left(1 + \frac{1}{T_I \cdot S}\right) \quad (1)$$

On the other hand, a transfer function $C_{SV}(S)$ between SV→MV is given by:

$$C_{SV}(S) = \frac{MV}{SV} = K_P\left(\alpha + \frac{1}{T_I \cdot S} - \frac{\beta_0}{1 + T_I \cdot S}\right) \quad (2)$$

where $\alpha$ is a 2DOF coefficient (a constant which can be set between 0 and 1) of the proportional gain, and $\beta_0$ is a 2DOF coefficient (a constant which can be set between 0 and 1) of the integral time. Therefore, after $K_p$ and $T_I$ are determined to optimize a process-disturbance control characteristic from the above equations, $\alpha$ and $\beta_0$ can be determined to optimize a setpoint-following characteristic, thus realizing 2DOF control.

FIG. 2 is a diagram showing an arrangement of a conventional 2DOF PID controller disclosed in U.S. Pat. No. 4,755,924. This controller has a setpoint filter 10 which follows a change in setpoint value, and performs complete 2DOF PID control associated with PID. More specifically, the setpoint filter 10 receives a setpoint value SV, and performs calculation processing for realizing complete 2DOF-control of three terms, i.e., a proportional gain $K_p$, an integral time $T_I$, and a derivative time $T_D$, thereby outputting a control setpoint value $SV_0$. The control setpoint value $SV_0$ obtained from the setpoint filter 10, and a control value PV from a controlled system 2 are supplied to a deviation-calculating means 3, and are subjected to a calculation ($SV_0-PV$), thereby obtaining a deviation E. The deviation E is supplied to a PI control operation means 4 expressed by a transfer function $K_P\{1+1/(T_I\cdot S)\}$ (where $K_P$ is the proportional gain, $T_I$ is the integral time, and S is the Laplace operator) via a nonlinear processing means 6. The PI control operation means 4 executes a PI control operation on the basis of the transfer function, and a calculated manipulative variable MV is supplied to a subtraction means 7. The subtraction means 7 subtracts the output from an incomplete derivative means 8 for performing an incomplete derivative on the basis of the control value PV from the manipulative variable MV, and a calculated difference signal is supplied to an addition means 5. The addition means 5 adds the output signal from the subtraction means 7 and a disturbance signal D, and the sum signal is applied to the controlled system 2. Thus, the system 2 is controlled so that the setpoint value $SV_0$=the control value PV.

The setpoint filter 10 comprises a lead/lag means $10_1$, a 1st lag means $10_2$, an incomplete derivative means $10_3$, and an incomplete derivative means $10_4$, which have the similar functions as those in the setpoint filter 1.

The incomplete derivative means $10_4$ is adopted to realize 2DOF control, and is expressed by a transfer function $\{(\gamma T_D\cdot S)/(1+\eta T_D\cdot S)\}$. Furthermore, the filter 10 comprises a subtraction means $10_5$, so that the output from the 1st lag means $10_2$ is subtracted from the output from the incomplete derivative means $10_4$. The difference is supplied to the incomplete derivative means $10_3$. The output from the incomplete derivative means $10_3$ and the output from the lead/lag means $10_1$ are added to each other by an addition means $10_6$, thus obtaining the control setpoint value $SV_0$.

Therefore, a transfer function $C_{PV}(S)$ between PV→MV of the setpoint filter 10 is given by:

$$C_{PV}(S) = \frac{-MV}{PV} = K_P\left(1 + \frac{1}{T_I \cdot S} + \frac{T_D \cdot S}{1 + \eta T_D \cdot S}\right) \quad (3)$$

On the other hand, a transfer function $C_{SV}(S)$ between SV→MV is given by:

$$C_{SV}(S) = \frac{MV}{SV} \quad (4)$$

-continued $$= K_P \left\{ \alpha + \left( \frac{1}{T_I \cdot S} - \frac{\beta_0}{1 + T_I \cdot S} \right) + \frac{\gamma T_D \cdot S}{1 + \eta T_D \cdot S} \right\}$$

where $\eta$ is a constant which can be set between 0.1 and 1, $\alpha$ is a 2DOF coefficient (a constant which can be set between 0 and 1) of the proportional gain, $\beta_0$ is a 2DOF coefficient (a constant which can be set between 0 and 1) of the integral time, and $\gamma$ is a 2DOF coefficient (a constant which can be set between 0 and 2) of the derivative time.

Therefore, after $K_P$, $T_I$, and $T_D$ are determined to optimize a process-disturbance control characteristic on the basis of equations (3) and (4), $\alpha$, $\beta_0$, and $\gamma$ can be determined to optimize a setpoint-following characteristic, thus realizing 2DOF PID control.

However, although the above-mentioned PI or PID controller has various features, the following problems are pointed out.

① There are three or more functional blocks associated with time, which are added to realize 2DOF control. Therefore, the entire plant instrumentation system requires a vary large number of functional blocks.

In general, a large number of PID control loops are used in a plant instrumentation system. Therefore, if at least one functional block can be eliminated per PID control loop, a system load can be greatly reduced, and an operation speed can be increased accordingly. In other words, when PI or PID 2DOF control is realized using a smaller number of functional blocks, practical merits are considerable.

② An optimal value of the 2DOF coefficient $\beta_0$ of the integral time largely depends on the magnitude of L/T (L: idling time, T: time constant) of a controlled system.

More specifically, the value of the 2DOF coefficient $\alpha$ of the proportional gain can be specified by CHR (Chien Hrones Reswick) or the like in a PID parameter optimizing control method. However, the value of the 2DOF coefficient $\beta_0$ of the integral time cannot be specified, and must be specified by trials and errors in units of characteristics of controlled systems 2. However, since the 2DOF coefficient $\beta_0$ of the integral time has a high gain, a process characteristic is considerably changed when the gain of $\beta_0$ is controlled. Therefore, it is difficult to attain fine tuning, resulting in cumbersome control.

③ The role of 2DOF control of the setpoint filter is not clear.

In general, several tens to several thousands of PID control loops are distributed in a single plant instrumentation system. Therefore, if their roles are clarified, the control loops are industrially useful. When analysis of an abnormality is performed, or when the loops are applied to various modifications, a simple functional arrangement is indispensable. However, in the existing PID control loop, the role of the 2DOF control of the setpoint filter is not clear. Nonlinear processing is inaccurate.

④ Nonlinear processing is inaccurate.

In the conventional PID controller, a control value PV is supplied to the incomplete derivative means 8, and an incomplete derivative output from the incomplete derivative means 8 is supplied to the output side of the PI control operation means 4. Therefore, the incomplete derivative output bypasses the nonlinear processing means 6 to which the deviation E is input. As a result, nonlinear processing cannot be accurately, simply, and desirably executed, and controllability is limited.

Therefore, in order to completely transit from 1DOF PID to 2DOF PID, it is very important to perfectly overcome the above-mentioned problems.

SUMMARY OF THE INVENTION

It is the first object of the present invention to provide a PI or PID 2DOF controller which can minimize the number of functional blocks, associated with time, for realizing 2DOF control of a setpoint filter.

It is the second object of the present invention to provide a PI or PID 2DOF controller which can easily adjust a 2DOF coefficient of an integral time.

It is the third object of the present invention to provide an ultimate PI or PID 2DOF controller in which the role of a setpoint filter is clarified.

In order to achieve the above objects, a first 2DOF controller according to the present invention comprises:

setpoint filter means for receiving a setpoint value, and outputting a control setpoint value, the setpoint filter means having a transfer function which follows the setpoint value, and is expressed by the following formula:

$$\frac{1 + \alpha \beta T_I \cdot S}{1 + \beta T_I \cdot S} \quad \text{(a)}$$

where $T_I$: an integral time, S : a Laplace operator, $\alpha$ : a constant which can be set between 0 and 1, and $\beta$ : a constant which can be set between 0 and about 10;

deviation-calculating means for calculating a deviation between the control setpoint value and a control value fed back from a controlled system;

control operation means for receiving the deviation, executing at least a PI (P : proportional, I : integral) control operation, and outputting a manipulative variable; and means for applying the manipulative variable to the controlled system.

A second 2DOF controller according to the present invention, comprises:

setpoint filter means for receiving a setpoint value, and outputting a control setpoint value, the setpoint filter means having a transfer function which follows the setpoint value, and is expressed by the following formula:

$$\alpha + (1 - \alpha) \cdot \left( \frac{1}{1 + \beta T_I \cdot S} \right) \quad \text{(b)}$$

where $T_I$: an integral time, S : a Laplace operator, $\alpha$ : a constant which can be set between 0 and 1, and $\beta$ : a constant which can be set between 0 and about 10;

deviation-calculating means for calculating a deviation between the control setpoint value and a control value fed back from a controlled system;

control operation means for receiving the deviation, executing at least a PI (P : proportional, I : integral)

control operation, and outputting a manipulative variable; and means for applying the manipulative variable to the controlled system.

A third 2DOF controller according to the present invention, comprises:

setpoint filter means for receiving a setpoint value, and outputting a control setpoint value, the setpoint filter means having a transfer function which follows the setpoint value and is expressed by the following formula:

$$1 - (1 - \alpha) \cdot \left(1 - \frac{1}{1 + \beta T_I \cdot S}\right) \tag{c}$$

where $T_I$: an integral time, S : a Laplace operator, $\alpha$ : a constant which can be set between 0 and 1, and $\beta$ : a constant which can be set between 0 and about 10;

deviation-calculating means for calculating a deviation between the control setpoint value and a control value fed back from a controlled system;

control operation means for receiving the deviation, executing at least a PI (P : proportional, I : integral) control operation, and outputting a manipulative variable; and means for applying the manipulative variable to the controlled system.

Therefore, the first to third 2DOF controllers of the present invention are provided to realize PI 2DOF control and can realize a setpoint filter using one time means based on their transfer functions with the above-mentioned means. Furthermore, a proportional gain and an integral time can be corrected by varying $\alpha$ and $\beta$ without influencing a process-disturbance control characteristic at all. In addition, since a time constant $\beta T_I$ is increased/decreased with an increase/decrease in $\beta$, linearity of an equivalent change in integral time with respect to a change in $\beta$ can be improved, thus significantly facilitating control.

In order to achieve the above object, a fourth 2DOF controller according to the present invention, comprises:

setpoint filter means for receiving a setpoint value, and outputting a control setpoint value, the set-point filter means executing a calculation given by the following equation upon reception of the setpoint value, and obtaining the control setpoint value $SV_0$:

$$SV_0 = SV \cdot \left(\frac{1 + \alpha\beta T_I \cdot S}{1 + \beta T_I \cdot S}\right) + \tag{d}$$

$$(SV \cdot \alpha \cdot \gamma - PV) \cdot \left(\frac{T_D \cdot S}{1 + \eta T_D \cdot S}\right)$$

where SV : a setpoint value, PV : a control value, $T_I$: an integral time, $T_D$ : a derivative time, S : a Laplace operator, $\alpha$ : a constant which can be set between 0 and 1, $\beta$ : a constant which can be set between 0 and about 10, $\gamma$ : a constant which can be set between 0 and 2, and $\eta$ : a constant which can be set between 0.1 and 1;

deviation-calculating means for calculating a deviation between the control setpoint value and a control value fed back from a controlled system;

control operation means for receiving the deviation, executing at least a PI (P : proportional, I : integral) control operation, and outputting a manipulative variable; and means for applying the manipulative variable to the controlled system.

A fifth 2DOF controller according to the present invention, comprises:

setpoint filter means for receiving a setpoint value, and outputting a control setpoint value, the setpoint filter means executing a calculation given by the following equation upon reception of the setpoint value, and obtaining the control setpoint value $SV_0$:

$$SV_0 = SV\left\{\alpha + (1 - \alpha) \cdot \left(\frac{1}{1 + T_I \cdot S}\right)\right\} + \tag{e}$$

$$(SV \cdot \alpha\gamma - PV) \cdot \frac{1}{\eta} \cdot \left(1 - \frac{1}{1 + \eta T_D \cdot S}\right)$$

where SV : a setpoint value, PV : a control value, $T_I$: an integral time, $T_D$ : a derivative time, S : a Laplace operator, $\alpha$ : a constant which can be set between 0 and 1, $\beta$ : a constant which can be set between 0 and about 10, $\gamma$ : a constant which can be set between 0 and 2, and $\eta$ : a constant which can be set between 0.1 and 1;

deviation-calculating means for calculating a deviation between the control setpoint value and a control value fed back from a controlled system;

control operation means for receiving the deviation, executing at least a PI (P : proportional, I : integral) control operation, and outputting a manipulative variable; and means for applying the manipulative variable to the controlled system.

A sixth 2DOF controller according to the present invention, comprises:

setpoint filter means for receiving a setpoint value, and outputting a control setpoint value, the set-point filter means executing a calculation given by the following equation upon reception of the setpoint value, and obtaining the control setpoint value $SV_0$:

$$SV_0 = SV \cdot \alpha + \{SV(1 - \alpha) - D(S)\} \cdot \frac{1}{1 + \beta T_I \cdot S} + D(S) \tag{f}$$

for $$D(S) = (SV \cdot \alpha \cdot \gamma - PV) \cdot \left(\frac{T_D \cdot S}{1 + \eta T_D \cdot S}\right)$$

where SV : a setpoint value, PV : a control value, $T_I$: an integral time, $T_D$ : a derivative time, S : a Laplace operator, $\alpha$ : a constant which can be set between 0 and 1, $\beta$ : a constant which can be set between 0 and about 10, $\gamma$ : a constant which can be set between 0 and 2, and $\eta$ : a constant which can be set between 0.1 and 1;

deviation-calculating means for calculating a deviation between the control setpoint value and a control value fed back from a controlled system;

control operation means for receiving the deviation, executing at least a PI (P : proportional, I : integral) control operation, and outputting a manipulative variable; and means for applying the manipulative variable to the controlled system.

A seventh 2DOF controller according to the present invention, comprises:

setpoint filter means for receiving a setpoint value, and outputting a control setpoint value, the setpoint filter means executing a calculation given by the following equation upon reception of the setpoint value, and obtaining the control setpoint value $SV_0$:

$$SV_0 = SV \cdot \alpha + \{SV(1 - \alpha) - D(S)\} \cdot \frac{1}{1 + \beta T_I \cdot S} + D(S) \quad (f)$$

for $$D(S) = (SV \cdot \alpha \cdot \gamma - PV) \cdot \frac{1}{\eta} \left( 1 - \frac{T_D \cdot S}{1 + \eta T_D \cdot S} \right)$$

where SV : a setpoint value, PV : a control value, $T_I$ : an integral time, $T_D$ : a derivative time, S : a Laplace operator, $\alpha$ : a constant which can be set between 0 and 1, $\beta$ : a constant which can be set between 0 and about 10, $\gamma$ : a constant which can be set between 0 and 2, and $\eta$ : a constant which can be set between 0.1 and 1;

deviation-calculating means for calculating a deviation between the control setpoint value and a control value fed back from a controlled system;

control operation means for receiving the deviation, executing at least a PI (P : proportional, I : integral) control operation, and outputting a manipulative variable; and means for applying the manipulative variable to the controlled system.

An eighth 2DOF controller according to the present invention, comprises:

setpoint filter means for receiving a setpoint value, and outputting a control setpoint value, the setpoint filter means executing a calculation given by the following equation upon reception of the setpoint value, and obtaining the control setpoint value $SV_0$:

$$SV_0 = SV \cdot \frac{1 + \alpha \beta T_I \cdot S}{1 + \beta T_I \cdot S} + (SV \cdot \alpha \cdot \gamma - PV) \cdot \quad (g)$$

$$\left( \frac{T_D \cdot S}{1 + \eta T_D \cdot S} \right) \cdot \left( \frac{\beta T_I \cdot S}{1 + \beta T_I \cdot S} \right)$$

where SV : a setpoint value, PV : a control value, $T_I$ : an integral time, $T_D$ : a derivative time, S : a Laplace operator, $\alpha$ : a constant which can be set between 0 and 1, $\beta$ : a constant which can be set between 0 and about 10, $\gamma$ : a constant which can be set between 0 and 2, and $\eta$ : a constant which can be set between 0.1 and 1;

deviation-calculating means for calculating a deviation between the control setpoint value and a control value fed back from a controlled system;

control operation means for receiving the deviation, executing at least a PI (P : proportional, I : integral) control operation, and outputting a manipulative variable; and means for applying the manipulative variable to the controlled system.

According to the fourth to eighth 2DOF controllers of the present invention, a derivative is added to the above-mentioned first 2DOF controller. A setpoint filter can be realized by two time means. Furthermore, complete 2DOF control of three PID terms can be realized without influencing a process-disturbance control characteristic at all. The same operation as in the first 2DOF controller can be executed for an increase/decrease in $\beta$.

As described above, according to the present invention, the number of functional blocks, associated with time, for realizing 2DOF control of a setpoint filter can be minimized, and control of a 2DOF coefficient of an integral time can be considerably facilitated. Furthermore, the role of the setpoint filter can be clarified. Therefore, a 2DOF controller which can vastly improve plant operation characteristics, and can greatly contribute to the industrial field can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6 and 7 are block diagrams of 2DOF controllers according to the second and third embodiments of the present invention;

FIG. 8 is a block diagram showing a 2DOF controller according to the fourth embodiment of the present invention;

FIG. 9 is a block diagram showing a conventional active/interference deviation PID controller for the purpose of comparison with the controller shown in FIG. 8;

DETAILED DESCRIPTION OF THE PREFERRED EMBODIMENTS

Figure 1:
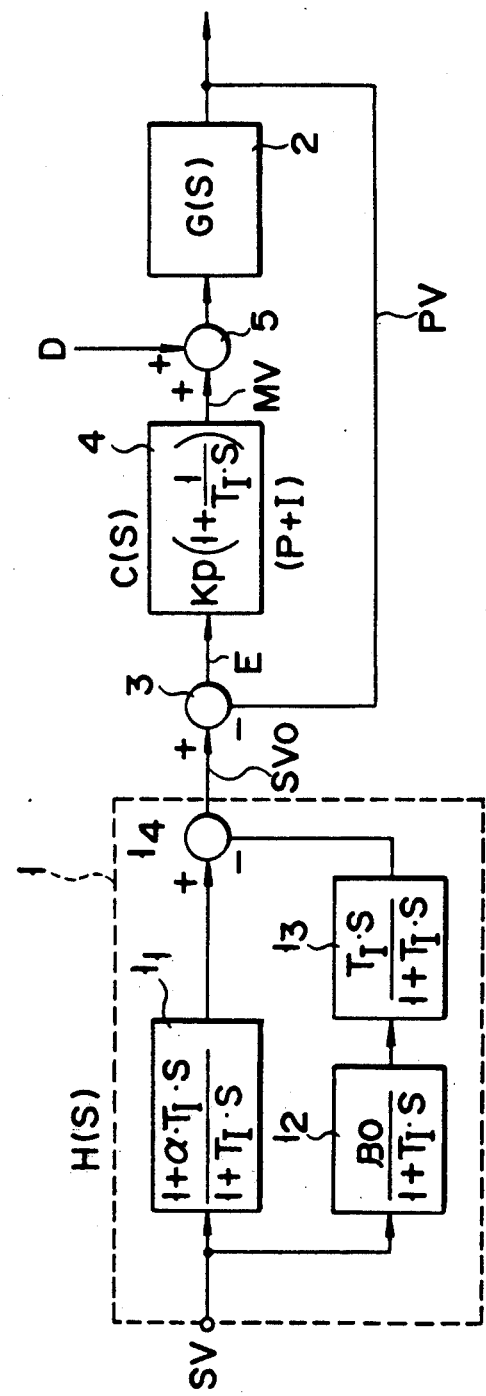
FIGS. 1 and 2 are block diagrams showing conventional controllers.

A 2DOF PI controller according to the first embodiment of the present invention will be described below with reference to FIG. 3. The 2DOF controller of this embodiment is used in a machine or chemical plants and a controlled system 2 includes a temperature, a liquid level, a pressure, a flow rate, and the like. A difference between this embodiment and the conventional 2DOF PI controller shown in FIG. 1 lies in a setpoint filter 20. Therefore, the same reference numerals in FIG. 3 denote the same parts as in FIG. 1, and a detailed description thereof will be omitted. The 2DOF PI controller of this embodiment comprises the setpoint filter 20 including an integral time $T_I$ of a PI control operation means 4. The setpoint filter 20 performs a following operation based on a change in setpoint value, and outputs a control setpoint value $SV_0$.

The setpoint filter 20 employs a transfer function H(S) given by, e.g.:

$$\frac{1 + \alpha\beta T_I \cdot S}{1 + \beta T_I \cdot S} \qquad (5)$$

That is, the filter 20 employs lead/lag means 21 constituted by the integral time $T_I$ and constants ($\alpha$, $\beta$). Note that the setpoint filter 20 having the above-mentioned transfer function H(S) can be realized by a hardware arrangement comprising resistors, capacitors, semiconductor elements, and the like, or can be realized in a software manner using a computer program.

When the setpoint filter 20 having the above-mentioned transfer function is used, 2DOF PI control can be realized. This will be described below. Assuming that the transfer function H(S) of the setpoint filter 20 is expressed by relation (5) above, a transfer function $C_{PV}(S)$ between PV→MV and a transfer function $C_{SV}(S)$ between SV→MV can be respectively expressed by:

$$C_{PV}(S) = \frac{-MV}{PV} = C(S) = K_p\left(1 + \frac{1}{T_I \cdot S}\right) \qquad (6)$$

$$\begin{aligned}C_{SV}(S) &= \frac{MV}{SV} = H(S) \cdot C(S) \\ &= \left(\frac{1 + \alpha\beta T_I \cdot S}{1 + \beta T_I \cdot S}\right) \cdot K_p \cdot \left(1 + \frac{1}{T_I \cdot S}\right) \\ &= K_p\left[\alpha + \left(\frac{1}{T_I \cdot S} - \frac{(1-\alpha)(\beta-1)}{1 + \beta T_I \cdot S}\right)\right]\end{aligned} \qquad (7)$$

In equation (7), the first term in the parentheses represents a P (proportional) operation, the second term represents an I (integral) operation, $\alpha$ is a 2DOF coefficient of a proportional gain, and $\beta$ is a 2DOF coefficient of an integral time.

Therefore, as can be understood from equations (6) and (7), the proportional gain can be corrected by varying $\alpha$, and the integral time can be equivalently corrected by varying $\beta$, in a control algorithm for a change in setpoint value SV without influencing a control algorithm for a change in PV at all, thus realizing 2DOF control.

Figure 3:
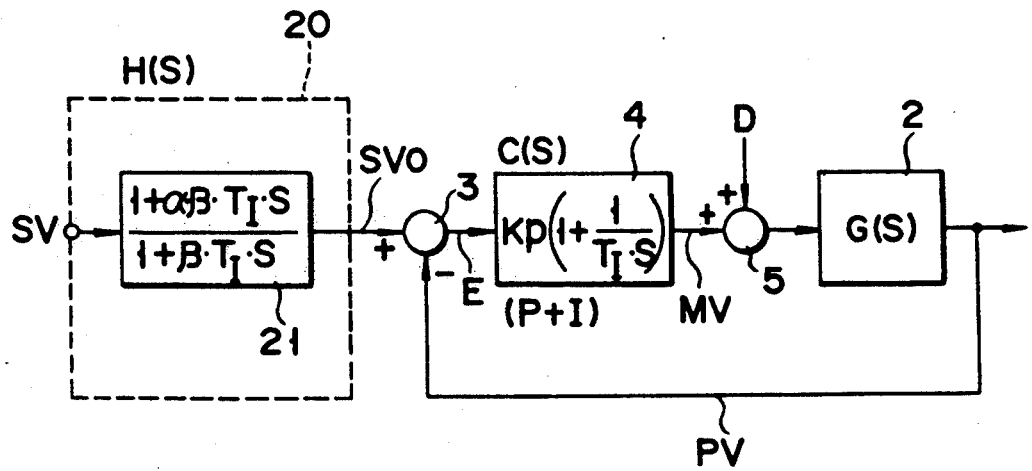
FIG. 3 is a block diagram showing a 2DOF controller according to the first embodiment of the present invention.

Therefore, in the setpoint filter 20 shown in FIG. 3,
(a) When $\alpha=0$ and $\beta=1$, ... I-P control
(b) When $\alpha=0$ and $\beta$=variable, ... 2DOF PI (only I has 2DOF)
(c) When $\alpha$=variable, and $\beta$=variable, ... 2DOF PI (P and I both have 2DOF)

More specifically, the setpoint filter 20 can perform I-P control when $\alpha=0$ and $\beta=1$, can perform 2DOF control of I when $\beta$ is variable, as shown in (b), and can additionally perform 2DOF control of P when $\alpha$ is additionally variable, as shown in (c). In addition, the setpoint filter 20 employs one lead/lag means 21, and the function of the lead/lag means 21 can be maximally utilized. Therefore, an ultimate 2DOF PI controller can be realized.

Figure 4:
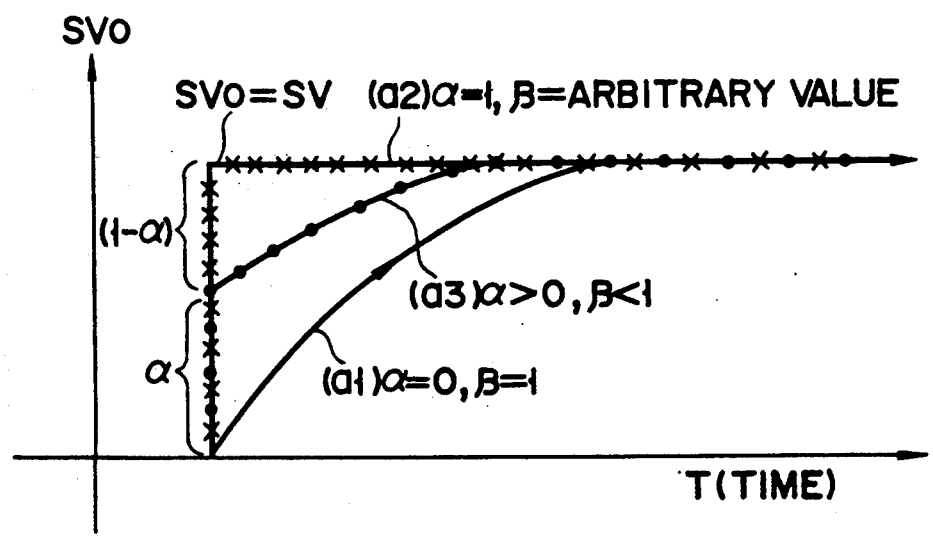
FIG. 4 is a graph showing response characteristics of a setpoint filter.
Figure 5:
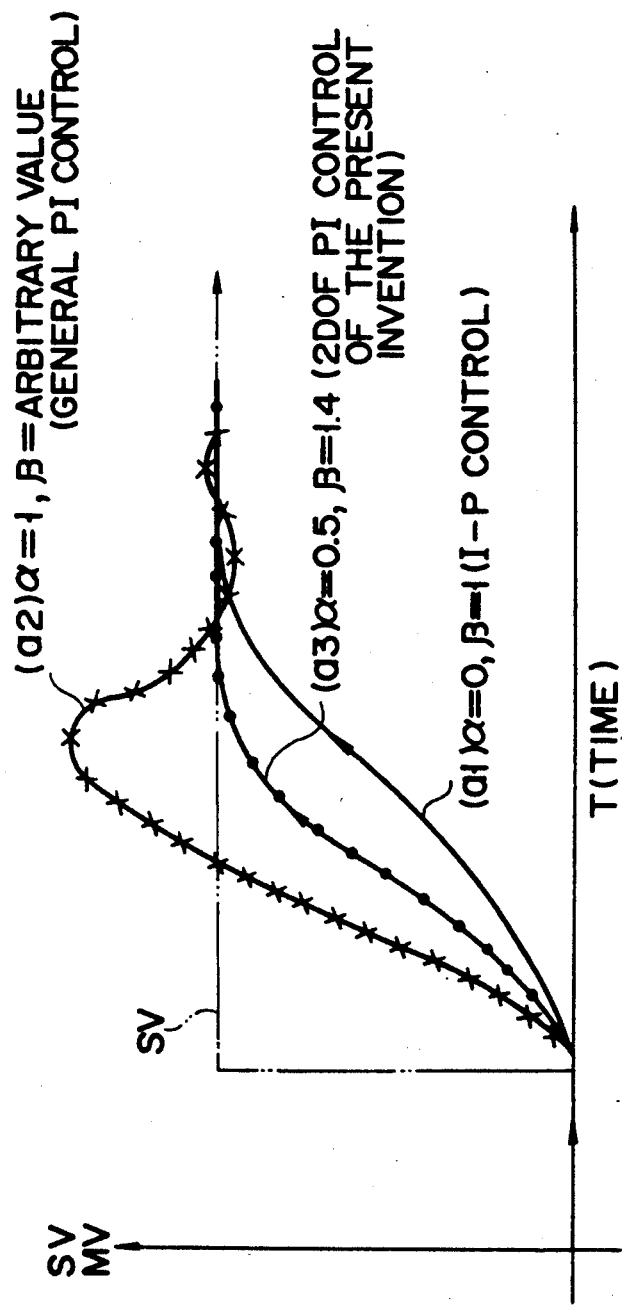
FIG. 5 is a graph showing a setpoint-following characteristic obtained when a process-disturbance control characteristic remains the same.

A qualitative description of 2DOF will be made below with reference to FIGS. 4 and 5. FIG. 4 shows a change in control setpoint value $SV_0$ depending on $\alpha$ and $\beta$ when a setpoint value SV is changed stepwise. FIG. 5 shows a change in control value PV depending on $\alpha$ and $\beta$.

Note that as the proportional gain $K_p$ and the integral time $T_I$, values best suitable for a process-disturbance control characteristic are assumed to be set.

When $\alpha=0$ and $\beta=1$, I-P control is performed, and a control setpoint value $SV_0$ reaches a setpoint value SV to have a considerable time lag, as indicated by a curve (a1) in FIG. 4. On the other hand, a response time of a control value PV changes as indicated by a curve (a1) in FIG. 5, and is very long.

When $\alpha=0$ and $\beta$=an arbitrary value, general PI control is performed, and the control setpoint value $SV_0$ becomes SV=$SV_0$, as indicated by a curve (a2) in FIG. 4. On the other hand, a response time of the control value PV is shortened, as indicated by a curve (a2) in FIG. 5. However, the control value PV considerably overshoots.

Therefore, it can be understood that there is an optimal point having a short response time without an overshoot in an intermediate portion between the I-P control and the general PI control.

Thus, a bias is applied by $\alpha$, as indicated by a curve (a3) in FIG. 4, and a rate of change is reduced from that of the curve (a1) in FIG. 4, accordingly. That is, $\beta>1$. As a result, an ideal response time which has a good setpoint-following characteristic and does not suffer from an overshoot can be obtained while keeping an optimal process-disturbance control characteristic, as indicated by a curve (a3) in FIG. 4.

2DOF control effects of the prior art and I (integral) of the controller of the present invention will be compared. If an integral term of the prior art is represented by $I_0(S)$ and that of the present invention is represented by $I(S)$, from equation (2), $I_0(s)$ is given by:

$$I_0(S) = \frac{1}{T_I \cdot S} - \frac{\beta_0}{1 + T_I \cdot S} \qquad (8)$$

From equation (7), the integral term I(S) of the present invention is given by:

$$I(S) = \frac{1}{T_I \cdot S} - \frac{(1-\alpha)(\beta-1)}{1 + \beta T_I \cdot S} \qquad (9)$$

Therefore, in the prior art, as can be seen from equation (8), when the time constant $T_I$ is constant, the magnitude of $\beta_0$ is directly reflected in the integral term. Therefore, it is difficult to control the gain of the 2DOF coefficient of the integral time. On the other hand, according to this embodiment, as can be seen from equation (9), since $\beta T_I$ in the denominator is increased/decreased with an increase/decrease in $\beta$, linearity of an equivalent change in integral time $T_I$ with respect to a change in $\beta$ can be improved. In addition, since the magnitude of $\alpha$ is reflected, the influence of characteristics of the controlled system 2, i.e., L/T (L: idling time, T: time constant) on the optimal value of $\beta$ can be almost halved to 0.57 according to simulation results, and can be greatly improved. In other words, dependency of $\alpha$ and $\beta$ on a change in characteristics of G(S), i.e., a change in characteristics of a process can be reduced. With reference to changes in $\alpha$ and $\beta$ in the conventional 2DOF controller shown in FIG. 1, a change in $\alpha$ in this embodiment is about 70%, and a change in $\beta$ is about 60%.

A 2DOF PI controller according to the second embodiment of the present invention will be described below with reference to FIG. 6. The 2DOF PI controller comprises a setpoint filter 30 including an integral time $T_I$ of a PI control operation means 4 like in FIG. 3. The setpoint filter 30 employs a 1st lag filter expressed by a transfer function H(S) given by equation (10) below obtained by modifying equation (5) described above:

$$\frac{1 + \alpha\beta T_I \cdot S}{1 + \beta T_I \cdot S} = \alpha + (1 - \alpha) \cdot \frac{1}{1 + \beta T_I \cdot S} \quad (10)$$

That is, the filter 30 employs a 1st lag filter which uses a product of an integral time $T_I$ and a constant $\beta$ as a time constant.

More specifically, the setpoint filter 30 comprises a coefficient means 31, a subtraction means 32, a 1st lag means 33, and an addition means 34. The coefficient means 31 multiplies a setpoint value SV with a coefficient $\alpha$. The subtraction means 32 subtracts the output from the coefficient means 31 from the setpoint value SV. The 1st lag means 33 performs a 1st lag operation of the output from the subtraction means 32. The addition means 34 adds the output from the 1st lag means 33 and the output from the coefficient means 31.

A control setpoint value $SV_0$ obtained from the addition means 34 is supplied to a deviation-calculating means 3.

Equations (5) and (10) are functionally the same as each other. In this case, equation (10) allows an easier operation since it is constituted by only 1st delay means. Therefore, according to this arrangement of the controller, an operation is easy, and a D (derivative) operation functional block (not shown) can be easily coupled.

A 2DOF PI controller according to the third embodiment of the present invention will be described below with reference to FIG. 7. The 2DOF PI controller comprises a setpoint filter 40. The setpoint filter 40 is expressed by a transfer function H(S) given by equation (11) below obtained by modifying equation (5) described above. That is, the setpoint filter 40 can be readily realized by a 1st lag filter using a product of an integral time $T_I$ and a constant $\beta$ as a time constant.

$$\frac{1 + \alpha\beta T_I \cdot S}{1 + \beta T_I \cdot S} = 1 - (1 - \alpha) \cdot \left(1 - \frac{1}{1 + \beta T_I \cdot S}\right) \quad (11)$$

The setpoint filter 40 comprises a coefficient means 41, a subtraction means 42, a 1st lag means 43, a subtraction means 44, and an addition means 45. The coefficient means 41 multiplies a setpoint value SV with a constant $\alpha$. The subtraction means 42 subtracts the setpoint value SV from the output from the coefficient means 41. The 1st lag means 43 performs a 1st lag operation of the output from the subtraction means 42. The subtraction means 44 subtracts the output from the 1st lag means 43 from the output from the subtraction means 42. The addition means 45 adds the output from the subtraction means 44 and the setpoint value SV. A control setpoint value $SV_0$ obtained from the addition means 45 is supplied to a deviation-calculating means 3.

Equation (11) as the transfer function of the setpoint filter 40 is functionally equivalent to the setpoint filter 20 having the transfer function given by equation (5) since it is obtained by modifying equation (5) by a final-value theorem. However, since equation (11) is constituted by only 1st lag means like in FIG. 6, an operation is very easy.

Figure 2:
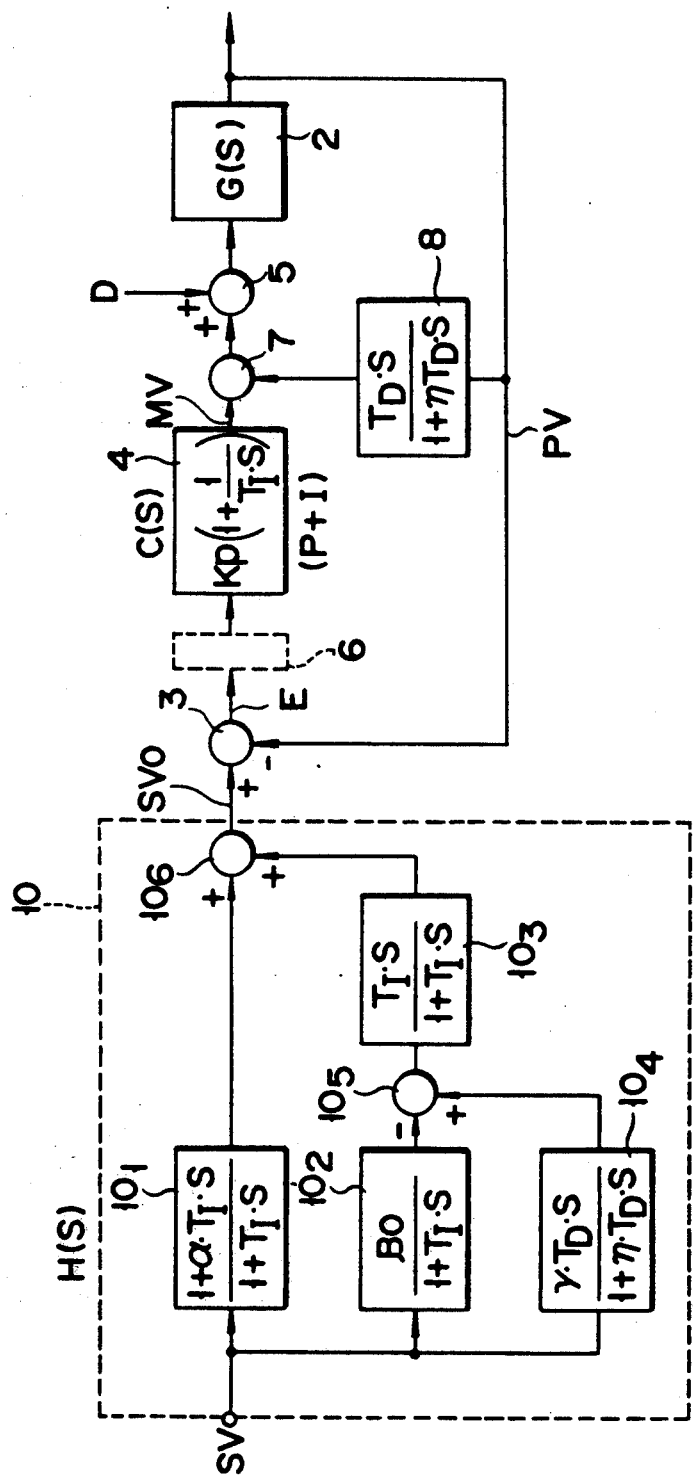

A 2DOF PID controller according to the fourth embodiment of the present invention will be described below with reference to FIG. 8. This embodiment aims at complete 2DOF control of three PID terms. The same reference numerals in FIG. 8 denote the same parts as in FIG. 2, and a detailed description thereof will be omitted. The controller comprises a setpoint filter 50. The setpoint filter 50 includes an integral time $T_I$ of a PI control operation means 4, and performs a setpoint-following operation with respect to a change in setpoint value SV. As a result, a control setpoint value $SV_0$ is obtained, and is supplied to a deviation-calculating means 3.

The setpoint filter 50 fetches not only the setpoint value SV but also a control value PV from a controlled system 2. The control setpoint value $SV_0$ for the PI control operation means 4 is output from the setpoint filter 50. The setpoint filter 50 is constituted based on the following equation (12):

$$SV_0 = SV \cdot \left(\frac{1 + \alpha\beta T_I \cdot S}{1 + \beta T_I \cdot S}\right) + \quad (12)$$

$$(SV \cdot \alpha \cdot \gamma - PV) \cdot \left(\frac{T_D \cdot S}{1 + \eta T_D \cdot S}\right)$$

$(1+\alpha\beta T_I S)/(1+\beta T_I S)$ of this equation serves as a lead/lag means if a product of an integral time $T_I$ and a constant $\beta$ is defined as a time constant. $(T_D S)/(1+\eta T_D S)$ represents an incomplete derivative having a derivative time $T_D$. In addition, $\eta$ is a constant which can be set between 0.1 and 1. Any of the above terms can be easily controlled The setpoint filter 50 comprises a lead/lag means 51 for performing a lead/lag operation upon reception of a setpoint value SV, a coefficient means 52, a subtraction means 53, an incomplete derivative means 54, and an addition means 55. The coefficient means 52 multiplies the setpoint value SV with predetermined coefficients $\alpha$ and $\beta$. The subtraction means 53 subtracts a control value PV from the output from the coefficient means 52. The incomplete derivative means 54 performs an incomplete derivative operation of the output from the subtraction means 53. The addition means 55 adds the output from the incomplete derivative means 54 and the output from the lead/lag means 51. A control setpoint value $SV_0$ is obtained from the addition means 55.

2DOF control can be realized by the arrangement of the setpoint filter 50. This will be described below. When the transfer function H(S) of the setpoint filter 50 is expressed by equation (5), a transfer function $C_{PV}(S)$ between PV→MV and a transfer function $C_{SV}(S)$ between SV→MV are respectively given by:

$$C_{PV}(S) = \frac{-MV}{PV} = \{1 + F(S)\} \cdot C(S) \quad (13)$$

$$= K_P\left(1 + \frac{1}{T_I \cdot S} + \frac{T_D}{T_I} \cdot \frac{1 + T_I \cdot S}{1 + \eta T_D \cdot S}\right)$$

$$C_{SV}(S) = \frac{MV}{SV} \tag{14}$$

$$= \left(\frac{1 + \alpha\beta T_I \cdot S}{1 + \beta T_I \cdot S} + \frac{\alpha\gamma T_D \cdot S}{1 + \eta T_D \cdot S}\right) \cdot C(S)$$

$$= \left(\alpha + \frac{1 - \alpha}{1 + \beta T_I \cdot S} + \frac{\alpha\gamma T_D \cdot S}{1 + \eta T_D \cdot S}\right) \cdot C(S)$$

$$= K_P\left[\alpha + \left(\frac{1}{T_I \cdot S} - \frac{(1 - \alpha)(1 - \beta)}{1 + \beta T_I \cdot S}\right) + \right.$$

$$\left. \alpha\gamma \cdot \frac{T_D}{T_I} \cdot \frac{1 + T_I \cdot S}{1 + \eta T_D \cdot S}\right]$$

where $\alpha$ is a 2DOF coefficient of a proportional gain, $\beta$ is a 2DOF coefficient of an integral time, and $\gamma$ is a 2DOF coefficient of a derivative time.

Whether or not derivative terms in equations (13) and (14) are proper will be proved below. Upon this proving, FIG. 9 shows a general active/interference type derivative PID controller, and proving will be made with reference to its derivative term.

The controller shown in FIG. 9 comprises a lead/lag means 9 having a transfer function given by $(1+T_D S)/(1+\eta T_D S)$, and a PI control operation means 4 connected in series with the lead/lag means 9. Therefore, a transfer function $F(S) \cdot C(S)$ of the overall controller shown in FIG. 9 is given by:

$$F(S) \cdot C(S) = \frac{1 + T_D \cdot S}{1 + \eta T_D \cdot S} \cdot K_P\left(1 + \frac{1}{T_I \cdot S}\right) \tag{15}$$

$$= K_P\left\{1 + \frac{1}{T_I \cdot S} + \right.$$

$$\left. (1 - \eta) \cdot \frac{T_D}{T_I} \cdot \frac{1 + T_I \cdot S}{1 + \eta T_D \cdot S}\right\}$$

Since $\eta$ in equation (15) is generally set to be 0.1, $(1-\eta)$ is 0.9. Other variables in the derivative term are the same as each other, $T_D < T_I$, and a steady state value is canceled by an integral operation. Therefore, derivative operations in equations (13) and (14) can be equivalent to a derivative operation of active/interference type derivative PID control.

Therefore, according to the controller of the fourth embodiment shown in FIG. 8, as can be seen from FIGS. 8 and 9, complete 2DOF control of three PID terms can be realized by adding only one lead/lag means 51 to the conventional PID controller, and setting $\alpha$, $\beta$, and $\gamma$.

Since equation (12) can be equivalently converted into the following equation, this equation may be adopted in the setpoint filter.

$$SV_0 = SV\left\{\alpha + (1 - \alpha) \cdot \left(\frac{1}{1 + \beta T_I \cdot S}\right)\right\} +$$

$$(SV \cdot \alpha \cdot \gamma - PV) \cdot \frac{1}{\eta} \cdot \left(1 - \frac{1}{1 + \eta T_D \cdot S}\right)$$

A 2DOF PID controller according to the fifth embodiment of the present invention will be described below with reference to FIG. 10. The PID controller comprises a setpoint filter 60 including an integral time $T_I$ of a PI control operation means 4, and a derivative time $T_D$. The setpoint filter 60 fetches a setpoint value SV and a control value PV, and outputs a control setpoint value $SV_0$. The control setpoint value $SV_0$ is supplied to a deviation-calculating means 3.

The setpoint filter 60 fetches not only the setpoint value SV but also the control value PV. The setpoint value $SV_0$ for the PI control operation means 4 is calculated by the setpoint filter 60, and is supplied to the deviation-calculating means 3. The setpoint filter 60 is expressed by equation (16):

$$SV_0 = SV \cdot \alpha + SV(1 - \alpha)\left(1 - \frac{1}{1 + \beta T_I \cdot S}\right) + D(S) \tag{16}$$

for $$D(S) = (SV \cdot \alpha \cdot \gamma - PV) \cdot \frac{1}{\eta} \cdot \left(1 - \frac{1}{1 + \eta T_D \cdot S}\right)$$

$1/(1+\beta T_I \cdot S)$ in equation (16) serves as a 1st lag means having a product of an integral time $T_I$ and a constant $\beta$ as a time constant. $1/(1+\eta T_D \cdot S)$ serves as a 1st lag means having a product of a derivative time $T_D$ and a constant $\eta$ as a time constant. These means can be easily controlled.

The setpoint filter 60 is constituted on the basis of equation (16) described above. More specifically, the filter 60 comprises coefficient means 61 and 62, a subtraction means 63, a division means 64, a 1st lag means 65, subtraction means 66 and 67, a 1st lag means 68, a subtraction means 69, and addition means 70 and 71.

The coefficient means 61 multiplies a setpoint value SV with a coefficient $\alpha$. The coefficient means 62 multiplies an output from the coefficient means 61 with a 2DOF coefficient $\gamma$ of the derivative time $T_D$, and supplies the obtained product signal to the subtraction means 63. The subtraction means 63 subtracts a control value PV from the output from the coefficient means 62, and supplies the difference to the division means 64. The division means 64 divides the output from the subtraction means 63 with a constant $\eta$ which can be set between 0.1 to 1, and supplies the quotient to the subtraction means 66 via the 1st lag means 65. The 1st lag means 65 performs a 1st lag operation using the product of the derivative time $T_D$ and the constant $\eta$ as the time constant. The subtraction means 66 subtracts the output from the 1st lag means 65 from the output from the division means 64.

The subtraction means 67 subtracts the output from the coefficient means 61 from the setpoint value SV, and supplies the obtained signal to the subtraction means 69 via the 1st lag means 68. The subtraction means 69 subtracts the output from the 1st lag means 68 from the output from the subtraction means 67. The addition means 70 adds the output from the subtraction means 69 and the output from the subtraction means 66. The addition means 71 adds the output from the coefficient means 61 and the output from the addition means 70 to obtain a control setpoint value $SV_0$.

Figure 10:
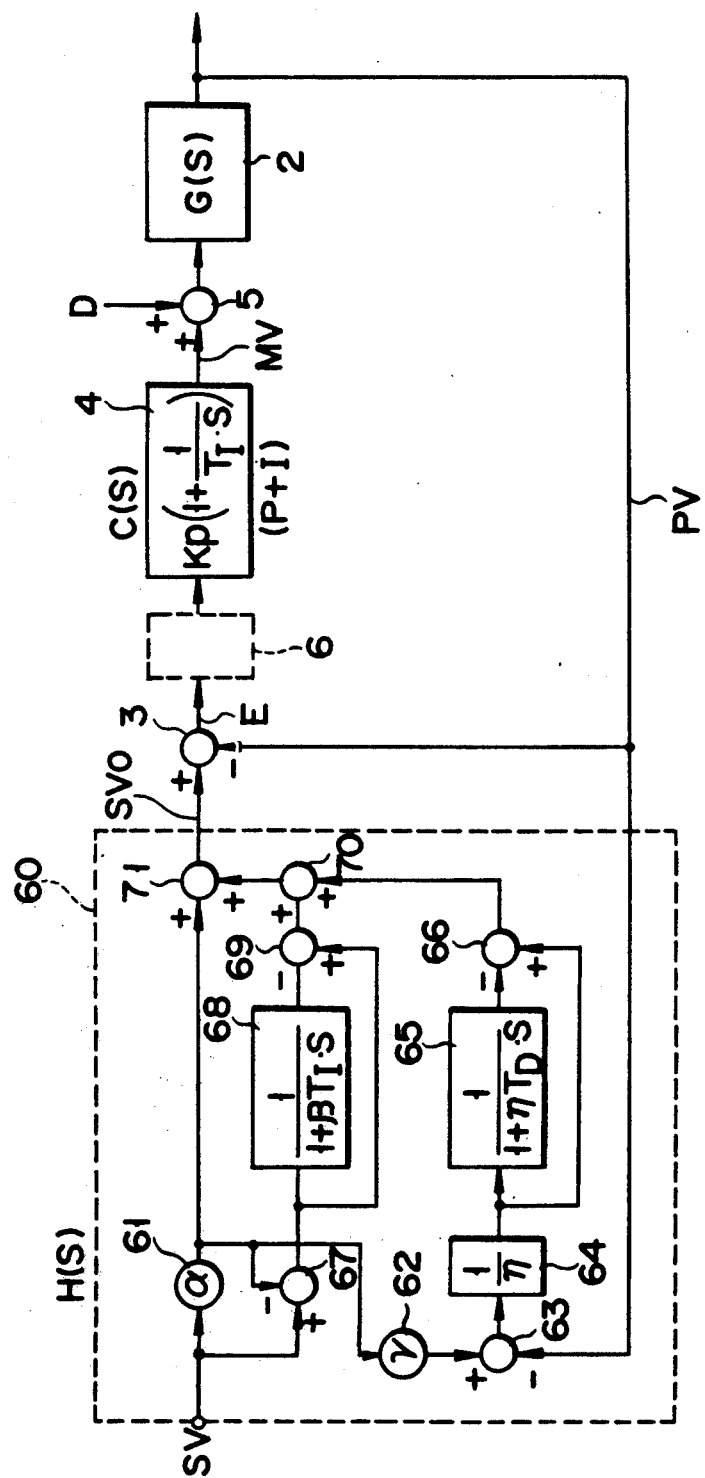
FIG. 10 is a block diagram showing a 2DOF controller according to the fifth embodiment of the present invention.

The embodiment shown in FIG. 10 is constituted by only 1st lag means by modifying both the lead/lag means 51 and the incomplete derivative means 54 shown in FIG. 8. Therefore, the function and the overall transfer function of this embodiment are the same as those of the embodiment shown in FIG. 8, and a detailed description thereof will be omitted.

A 2DOF PID controller according to the sixth embodiment of the present invention will be described below with reference to FIG. 11. The PID controller of this embodiment comprises a setpoint filter 80 including an integral time $T_I$ of a PI control operation means 4, and a derivative time $T_D$. The setpoint filter 80 fetches a setpoint value SV and a control value PV to output a control setpoint value $SV_0$. The control setpoint value $SV_0$ is supplied to a deviation-calculating means 3.

The setpoint filter 80 fetches not only the setpoint value SV but also the control value PV from a controlled system 2. The control setpoint value $SV_0$ for the PI control operation means 4 is output from the setpoint filter 80. The setpoint filter 80 is constituted based one equation (17):

$$SV_0 = SV \cdot \alpha + \{SV(1 - \alpha) - D(S)\} \frac{1}{1 + \beta T_I \cdot S} + D(S) \quad (17)$$

for $$D(S) = (SV \cdot \alpha \cdot \gamma - PV)\left(\frac{T_D \cdot S}{1 + \eta T_D \cdot S}\right)$$

$1/(1+\beta T_I S)$ in equation (17) serves as a 1st lag means having a product of an integral time $T_I$ and a constant $\beta$ 77 as a time constant. $(T_D S)/(1+\eta T_D S)$ serves as an incomplete derivative having a derivative time $T_D$. $\eta$ is a constant which can be set between 0.1 and 1. They can be easily controlled.

The setpoint filter 80 is constituted based on equation (17). More specifically, the filter 80 comprises coefficient means 81 and 82, a subtraction means 83, an incomplete derivative means 84, subtraction means 85 and 86, a 1st lag means 87, and addition means 88 and 89.

The coefficient means 81 multiplies a setpoint value SV with a coefficient $\alpha$. The coefficient means 82 multiplies an output from the coefficient means 81 with a 2DOF coefficient $\gamma$ of the derivative time $T_D$. The subtraction means 83 subtracts a control value PV from the product signal obtained from the coefficient means 82. The incomplete derivative means 84 performs an incomplete derivative to the output from the subtraction means 83, and supplies the result to the subtraction means 85.

The subtraction means 86 subtracts the output from the coefficient means 81 from the setpoint value SV, and supplies the obtained signal to the subtraction means 85. The subtraction means 85 subtracts the output from the incomplete derivative means 84 from the output from the subtraction means 86, and supplies the difference to the 1st lag means 87. The addition means 88 adds the output from the 1st lag means 87 and the output from the incomplete derivative means 84. The addition means 89 adds the output from the addition means 88 and the output from the coefficient means 81 to obtain a control setpoint value $SV_0$.

Therefore, the setpoint filter 80 of this embodiment realizes complete 2DOF control of three PID terms by adding the derivative operation to the embodiment shown in FIG. 6. More specifically, in the 2DOF controller of this embodiment, a derivative operation is shifted toward the setpoint value side upon addition of the derivative operation unlike in the prior art shown in FIG. 2. In addition, the number of means to be added is decreased, and the input to a nonlinear processing means 6 includes all the necessary factors. Therefore, since the means 6 is not bypassed, nonlinear processing can be accurately and simply performed.

Complete 2DOF control of the setpoint filter 80 shown in FIG. 11 will be proved below. When the transfer function H(S) of the setpoint filter 80 is expressed by equation (17), a transfer function $C_{PV}(S)$ between PV→MV and a transfer function $C_{SV}(S)$ between SV→MV are respectively given by:

$$C_{PV}(S) = \frac{-MV}{PV} = \quad (18)$$

$$\left\{1 + \left(\frac{T_D \cdot S}{1 + \eta T_D \cdot S} \cdot \frac{\beta T_I \cdot S}{1 + \beta T_I \cdot S}\right)\right\} C(S)$$

$$= K_P\left(1 + \frac{1}{T_I} + \frac{T_D \cdot S}{1 + \eta T_D \cdot S} \cdot \right.$$

$$\left. \frac{\beta(1 + T_I \cdot S)}{1 + \beta T_I \cdot S}\right) \cdot C(S)$$

$$C_{SV}(S) = \frac{MV}{SV} = \left(\frac{1 + \alpha \beta T_I \cdot S}{1 + \beta T_I \cdot S} + \frac{\alpha \gamma T_D \cdot S}{1 + \eta T_D \cdot S}\right) \cdot C(S) \quad (19)$$

$$= \left(\alpha + \frac{1 - \alpha}{1 + \beta T_I \cdot S} + \frac{T_D \cdot S}{1 + \eta T_D \cdot S} \cdot \right.$$

$$\left. \frac{\beta T_I \cdot S}{1 + \beta T_I \cdot S}\right) \cdot C(S)$$

$$= K_P\left[\alpha + \left(\frac{1}{T_I \cdot S} - \frac{(1 - \alpha)(1 - \beta)}{1 + \beta T_I \cdot S} + \right.\right.$$

$$\left.\left. \frac{\alpha \gamma T_D \cdot S}{1 + \eta T_D \cdot S} \cdot \frac{\beta(1 + T_I \cdot S)}{1 + \beta T_I \cdot S}\right)\right]$$

where $\alpha$ is a 2DOF coefficient of a proportional gain, $\beta$ is a 2DOF coefficient of an integral time, and $\gamma$ is a 2DOF coefficient of a derivative time.

Whether or not derivative operations of derivative terms in equations (18) and (19) are proper will be examined below. If a transfer function of a pure derivative term obtained by excluding 2DOF coefficients from the derivative terms in equations (18) and (19) is represented by Y(S), we have:

$$Y(S) = \frac{T_D \cdot S}{1 + \eta T_D \cdot S} \cdot \frac{\beta(1 + T_I \cdot S)}{1 + \beta T_I \cdot S} \quad (20)$$

The first term (former term) is a complete incomplete derivative formula. In the second term (latter term), an initial value is 1, and a final value is $\beta$. In, general, since $\eta < \beta$ ($\eta = 0.1$, $\beta \geq 1$), and $T_D < T_I$, time constants of the first and second terms have the following relation:

$$\eta T_D < \beta T_I \quad (21)$$

As a result, the second term plays a coefficient-like role in such a manner that when the setpoint value SV changes stepwise, the output from the second term is slowly changed toward $1 \rightarrow \beta$ (in general, $\beta$ is about 1.4). On the other hand, since the time constant of the first term is small, the first term becomes zero in a short period of time. Therefore, the second term almost does not influence the essential derivative operation. Consequently, from equations (18) and (19), 2DOF control of a proportional gain, an integral time, and a derivative time can be realized by varying $\alpha$, $\beta$ and $\gamma$, respectively.

A 2DOF PID controller according to the seventh embodiment of the present invention will be described below with reference to FIG. 12. The controller comprises a setpoint filter 90 including an integral time $T_I$ of a PI control operation means 4, and a derivative time $T_D$. The setpoint filter 90 fetches a setpoint value SV and a control value PV to output a control setpoint value $SV_0$. The control setpoint value $SV_0$ is supplied to a deviation-calculating means 3.

The setpoint filter 90 fetches not only the setpoint value SV but also the control value PV to calculate the setpoint value $SV_0$ for the PI control operation means 4.

More specifically, the setpoint filter 90 is constituted by modifying the transfer function of the incomplete derivative means 84 of the setpoint filter 80 shown in FIG. 11 as follows:

$$\frac{T_D \cdot S}{1 + \eta T_D \cdot S} = \frac{1}{\eta}\left(1 - \frac{1}{1 + \eta T_D \cdot S}\right) \quad (22)$$

Figure 11:
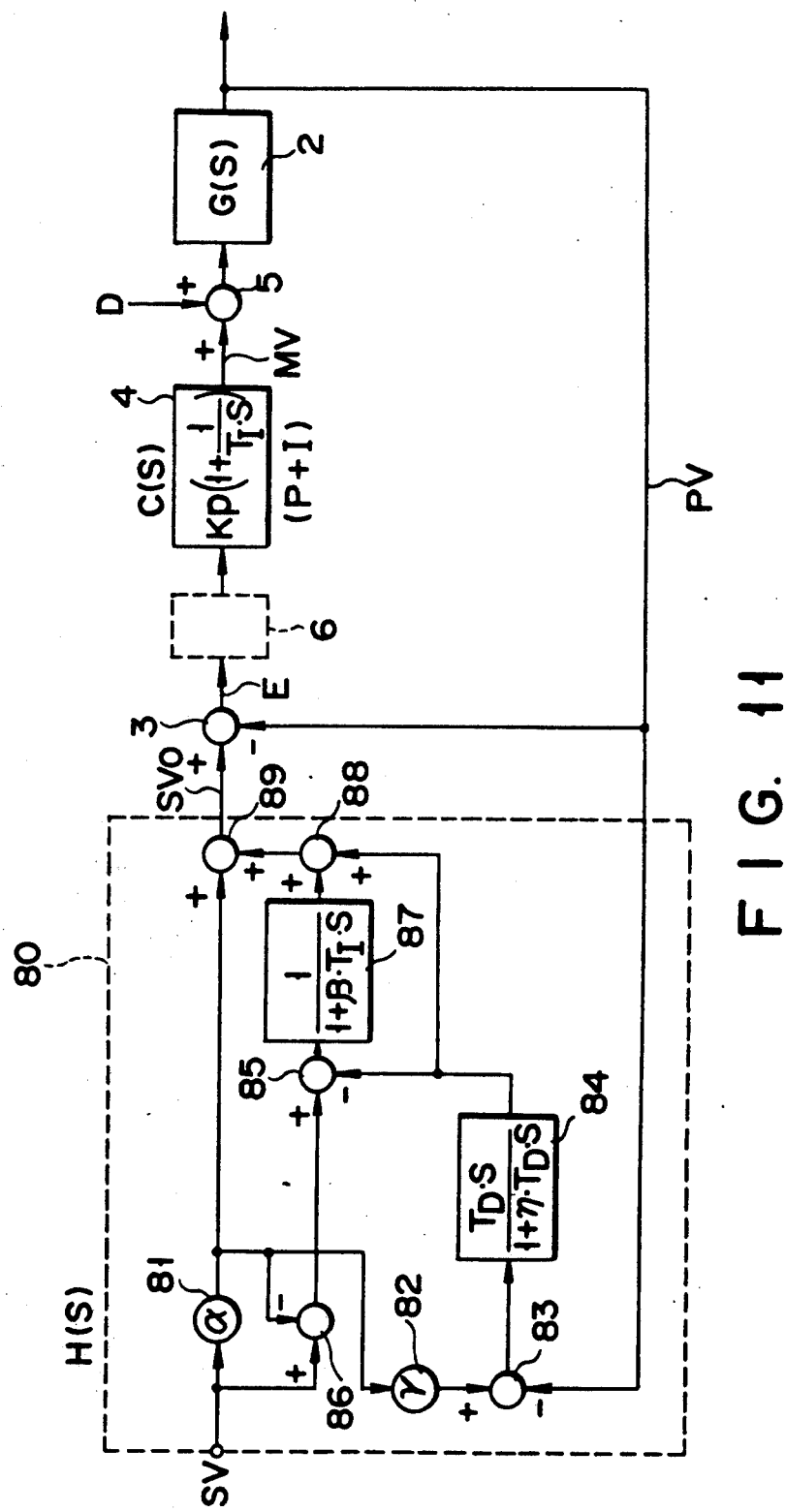
FIG. 11 is a block diagram showing a 2DOF controller according to the sixth embodiment of the present invention.

The setpoint filter 90 is substantially the same as the setpoint filter 80 shown in FIG. 11. A difference from FIG. 11 is that a division means 91, a 1st lag means 92, and a subtraction means 93 are arranged to constitute the transfer function. The division means 91 divides an output from a subtraction means 83 with a 2DOF coefficient $\eta$ of a derivative time, and supplies a quotient signal to the 1st lag means 92 and the subtraction means 93. The 1st lag means 92 executes a 1st lag operation of the output from the division means 91. The subtraction means 93 subtracts the output from the 1st lag means 92 from the output from the division means 91. In this manner, the transfer function expressed by equation (22) can be realized.

Figure 12:
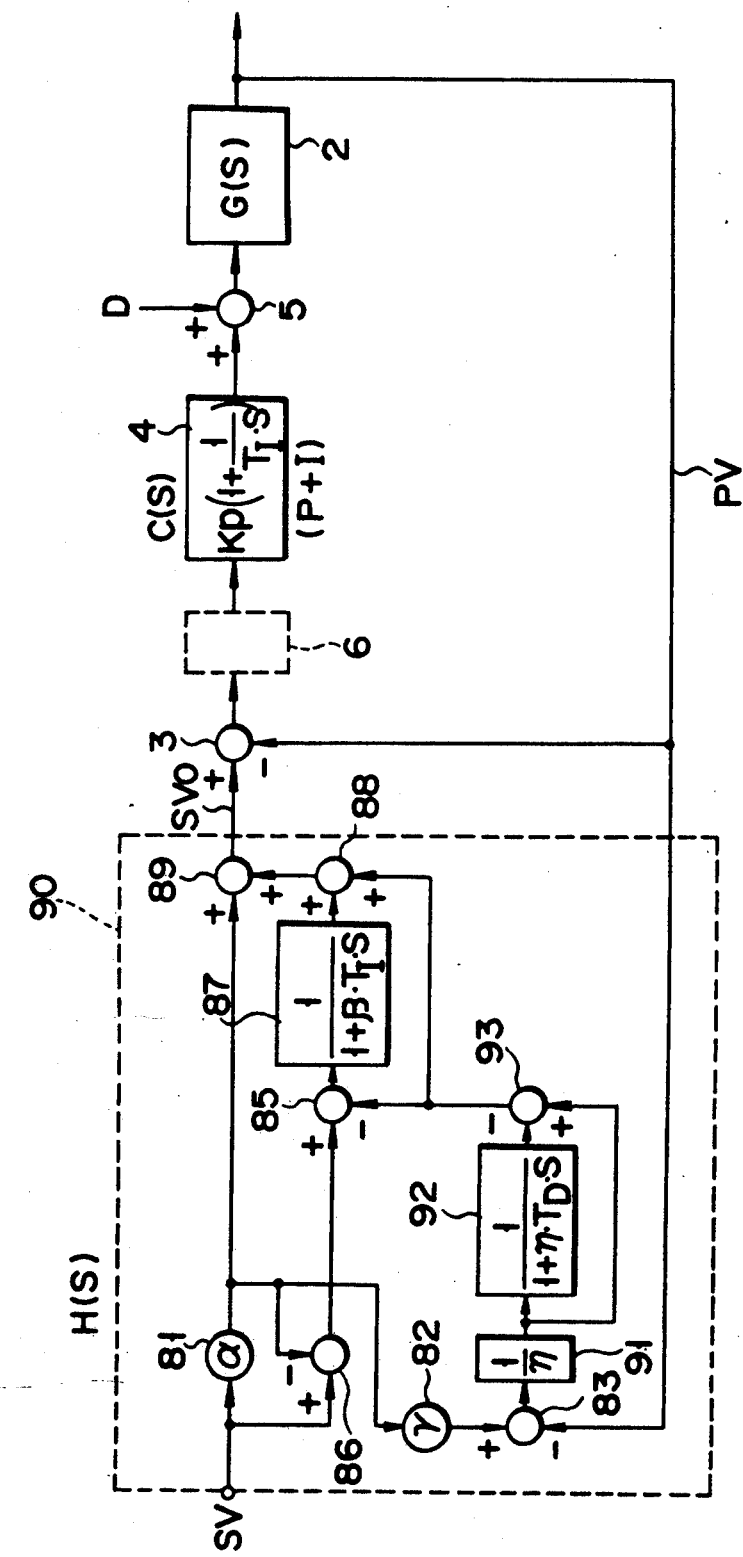
FIG. 12 is a block diagram showing a 2DOF controller according to the seventh embodiment of the present invention.

In the embodiment shown in FIG. 11 or 12, the setpoint filter 80 or 90 may employ the following equation so as to convert a setpoint value SV into a control setpoint value $SV_0$. This equation can be obtained by equivalently converting equation (16):

$$SV_0 = SV \cdot \frac{1 + \alpha\beta T_I \cdot S}{1 + \beta T_I \cdot S} + \quad (23)$$

$$(SV \cdot \alpha \cdot \gamma - PV) \cdot \left(\frac{T_D \cdot S}{1 + \eta T_D \cdot S}\right) \cdot \left(\frac{\beta T_I \cdot S}{1 + \beta T_I \cdot S}\right)$$

The 2DOF PI controller of each of the above embodiments is based on setpoint filter type I-P control, and combines some setpoint filter functions. A setpoint filter is constituted by a time means such as only one 1st lag means, thus realizing 2DOF control of PI. In the 2DOF PID controller of each of the above embodiments, a derivative operation is shifted toward the setpoint filter side in addition to the above features. Furthermore, a time means such as only one 1st lag means is used to realize complete 2DOF control of PID.

Therefore, the number of time means to be added to realize complete 2DOF control of PI or PID can be one, and the controller can be minimized. Since all the derivative operations are shifted toward the setpoint filter side, a conventional bypass circuit can be omitted. Therefore, nonlinear processing can be accurately, easily, and desirably executed. Since the dependency of an optimal 2DOF coefficient of an integral time on the magnitude of L/T of the controlled system 2 can be reduced to 0.68 for $\alpha$ and 0.57 for $\beta$, the 2DOF coefficient of the integral time can be almost a fixed value, and need not be controlled. Furthermore, since an arrangement is simple and is based on setpoint filter type I-P control, the roles of 2DOF coefficients can be clarified. Therefore, the control methods of $\alpha$, $\beta$, and $\gamma$ can be clear.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A PI type two degrees of freedom controller comprising:
    setpoint filter means for receiving a setpoint value, and outputting a control setpoint value, said setpoint filter means having a transfer function which follows the setpoint value, and is expressed by the following formula:

$$\frac{1 + \alpha\beta T_I \cdot S}{1 + \beta T_I \cdot S} \quad \text{(a)}$$

where $T_I$: an integral time, S: a Laplace operator, $\alpha$: a constant which can be set between 0 and 1, and $\beta$: a constant which can be set between 0 and about 10;
    deviation-calculating means for calculating a deviation between the control setpoint value and a control value fed back from a controlled system;
    control operation means for receiving the deviation, executing at least a PI (P: proportional, I: integral) control operation, and outputting a manipulative variable; and
    means for applying the manipulative variable to the controlled system.

2. A PI type two degrees of freedom controller comprising:
    setpoint filter means for receiving a setpoint value, and outputting a control setpoint value, said setpoint filter means having a transfer function which follows the setpoint value, and is expressed by the following formula:

$$\alpha + (1-\alpha) \cdot \left( \frac{1}{1 + \beta T_I \cdot S} \right) \quad \text{(b)}$$

where $T_I$: an integral time, S : a Laplace operator, $\alpha$ : a constant which can be set between 0 and 1, and $\beta$ : a constant which can be set between 0 and about 10;

deviation-calculating means for calculating a deviation between the control setpoint value and a control value fed back from a controlled system;

control operation means for receiving the deviation, executing at least a PI (P : proportional, I : integral) control operation, and outputting a manipulative variable; and means for applying the manipulative variable to the controlled system.

3. A controller according to claim 2, wherein said setpoint filter means includes:

multiplier means for multiplying the setpoint value with a predetermined constant and outputting a product;

subtraction means for subtracting the product from the setpoint value and outputting a difference;

1st lag means for performing a 1st lag operation of the difference and outputting a 1st lag output; and addition means for adding the 1st lag output and the product and outputting the control setpoint value.

4. A PI type two degrees of freedom controller comprising:

setpoint filter means for receiving a setpoint value, and outputting a control setpoint value, said setpoint filter means having a transfer function which follows the setpoint value, and is expressed by the following formula:

$$1 - (1-\alpha) \cdot \left( 1 - \frac{1}{1 + \beta T_I \cdot S} \right) \quad \text{(c)}$$

where $T_I$: an integral time, S : a Laplace operator, $\alpha$ : a constant which can be set between 0 and 1, and $\beta$ : a constant which can be set between 0 and about 10;

deviation-calculating means for calculating a deviation between the control setpoint value and a control value fed back from a controlled system;

control operation means for receiving the deviation, executing at least a PI (P : proportional, I : integral) control operation, and outputting a manipulative variable; and means for applying the manipulative variable to the controlled system.

5. A controller according to claim 4, wherein said setpoint filter means includes:

multiplier means for multiplying the setpoint value with a predetermined constant and outputting a product;

first subtraction means for subtracting the setpoint value from the product and outputting a first difference;

1st lag means for performing a 1st lag operation of the first difference and outputting a 1st lag output;

second subtraction means for subtracting the 1st lag output from the first difference and outputting a second difference; and addition means for adding the setpoint and the second difference and outputting the control setpoint value.

6. A PID type two degrees of freedom controller comprising:

setpoint filter means for receiving a setpoint value, and outputting a control setpoint value, said setpoint filter means executing a calculation given by the following equation upon reception of the setpoint value, and obtaining the control setpoint value $SV_0$:

$$SV_0 = SV \cdot \left( \frac{1 + \alpha \beta T_I \cdot S}{1 + \beta T_I \cdot S} \right) + (SV \cdot \alpha \cdot \gamma - PV) \cdot \left( \frac{T_D \cdot S}{1 + \eta T_D \cdot S} \right) \quad \text{(d)}$$

where SV : a setpoint value, PV : a control value, $T_I$ : an integral time, $T_D$ : a derivative time, S : a Laplace operator, $\alpha$ : a constant which can be set between 0 and 1, $\beta$ : a constant which can be set between 0 and about 10, $\gamma$ : a constant which can be set between 0 and 2, and $\eta$ : a constant which can be set between 0.1 and 1;

deviation-calculating means for calculating a deviation between the control setpoint value and a control value fed back from a controlled system;

control operation means for receiving the deviation, executing at least a PI (P : proportional, I : integral) control operation, and outputting a manipulative variable; and means for applying the manipulative variable to the controlled system.

7. A controller according to claim 6, wherein said setpoint filter means includes:

lead/lag operation means for executing a lead/lag operation of the setpoint value upon reception of the setpoint value, and outputting a lead/lag output;

multiplier means for multiplying the setpoint value with a predetermined constant and outputting a product;

subtraction means for subtracting the control value from the product and outputting a difference;

incomplete derivative means for executing an incomplete derivative of the difference and outputting an incomplete derivative output; and addition means for adding the lead/lag output and the incomplete derivative output and outputting the control setpoint value.

8. A controller according to claim 6, wherein said setpoint filter means includes:

first multiplier means for multiplying the setpoint value with a predetermined first constant and outputting a first product;

second multiplier means for multiplying the first product with a predetermined second constant and outputting a second product;

first subtraction means for subtracting the control value from the second product and outputting a first difference;

division means for dividing the first difference with a predetermined third constant and outputting a quotient;

first 1st lag means for executing a 1st lag operation of the quotient and outputting a first 1st lag output;

second subtraction means for subtracting the 1st lag output from the quotient and outputting a second difference;

third subtraction means for subtracting the first product from the setpoint value and outputting a third difference;

second 1st lag means for executing a 1st lag operation of the third difference and outputting a second 1st lag output;

fourth subtraction means for subtracting the second 1st lag output from the third difference and outputting a fourth difference;

first addition means for adding the second and fourth differences and outputting a sum; and second addition means for adding the first product and the sum and outputting the control setpoint value.

9. A PID type two degrees of freedom controller comprising:

setpoint filter means for receiving a setpoint value, and outputting a control setpoint value, said setpoint filter means executing a calculation given by the following equation upon reception of the setpoint value, and obtaining the control setpoint value $SV_0$:

$$SV_0 = SV\left\{\alpha + (1-\alpha) \cdot \left(\frac{1}{1+\beta T_I \cdot S}\right)\right\} + \quad (e)$$

$$(SV \cdot \alpha\gamma - PV) \cdot \frac{1}{\eta} \cdot \left(1 - \frac{1}{1+\eta T_D \cdot S}\right)$$

where SV a setpoint value, PV : a control value, $T_I$ : an integral time, $T_D$ : a derivative time, S : a Laplace operator, $\alpha$ : a constant which can be set between 0 and 1, $\beta$ : a constant which can be set between 0 and about 10, $\gamma$ : a constant which can be set between 0 and 2, and $\eta$ : a constant which can be set between 0.1 and 1;

deviation-calculating means for calculating a deviation between the control setpoint value and a control value fed back from a controlled system;

control operation means for receiving the deviation, executing at least a PI (P : proportional, I : integral) control operation, and outputting a manipulative variable; and means for applying the manipulative variable to the controlled system.

10. A PID type two degrees of freedom controller comprising:

setpoint filter means for receiving a setpoint value, and outputting a control setpoint value, said setpoint filter means executing a calculation given by the following equation upon reception of the setpoint value, and obtaining the control setpoint value $SV_0$:

$$SV_0 = SV \cdot \alpha + \{SV(1-\alpha) - D(S)\} \cdot \frac{1}{1+\beta T_I \cdot S} + D(S) \quad (f)$$

for $$D(S) = (SV \cdot \alpha \cdot \gamma - PV) \cdot \left(\frac{T_D \cdot S}{1+\eta T_D \cdot S}\right)$$

where SV : a setpoint value, PV : a control value, $T_I$ : an integral time, $T_D$ : a derivative time, S : a Laplace operator, $\alpha$ : a constant which can be set between 0 and 1, $\beta$ : a constant which can be set between 0 and about 10, $\gamma$ : a constant which can be set between 0 and 2, and $\eta$ : a constant which can be set between 0.1 and 1;

deviation-calculating means for calculating a deviation between the control setpoint value and a control value fed back from a controlled system;

control operation means for receiving the deviation, executing at least a PI (P : proportional, I : integral) control operation, and outputting a manipulative variable; and means for applying the manipulative variable to the controlled system.

11. A controller according to claim 10, wherein said setpoint filter means includes:

first multiplier means for receiving the setpoint value, multiplying the setpoint value with a predetermined first constant, and outputting a first product;

second multiplier means for multiplying the first product with a predetermined second constant and outputting a second product;

first subtraction means for subtracting the control value from the second product and outputting a first difference;

incomplete derivative means for executing an incomplete derivative of the first difference and outputting an incomplete derivative output;

second subtraction means for subtracting the first product from the setpoint value and outputting a second difference;

third subtraction means for subtracting the incomplete derivative output from the second difference and outputting a third difference;

1st lag operation means for executing a 1st lag operation of the third difference and outputting a 1st lag output;

first addition means for adding the 1st lag output and the incomplete derivative output and outputting a first sum output; and second addition means for adding the first product and the first sum output, and outputting the control setpoint value as a second sum.

12. A PID type two degrees of freedom controller comprising:

setpoint filter means for receiving a setpoint value, and outputting a control setpoint value, said setpoint filter means executing a calculation given by the following equation upon reception of the setpoint value, and obtaining the control setpoint value $SV_0$:

$$SV_0 = SV \cdot \alpha + \{SV(1-\alpha) - D(S)\} \cdot \frac{1}{1+\beta T_I \cdot S} + D(S) \quad (f)$$

for $$D(S) = (SV \cdot \alpha \cdot \gamma - PV) \cdot \frac{1}{\eta} \cdot \left(1 - \frac{1}{1+\eta T_D \cdot S}\right)$$

SV : a setpoint value, PV : a control value, $T_I$ : an integral time, $T_D$ : a derivative time, S : a Laplace operator, $\alpha$ : a constant which can be set between 0 and 1, $\beta$ : a constant which can be set between 0 and about 10, $\gamma$ : a constant which can be set between 0 and 2, and $\eta$ : a constant which can be set between 0.1 and 1;

means for calculating a deviation between the control setpoint value and a control value fed back from a controlled system;

control operation means for receiving the deviation, executing at least a PI (P : proportional, I : integral) control operation, and outputting a manipulative variable; and means for applying the manipulative variable to the controlled system.

13. A controller according to claim 12, wherein said setpoint filter means includes:

first multiplier means for receiving the setpoint value, multiplying the setpoint value with a predetermined first constant, and outputting a first product;

second multiplier means for multiplying the first product with a predetermined second constant and outputting a second product;

first subtraction means for subtracting the control value from the second product and outputting first difference;

division means for dividing the first difference with a third constant and outputting a quotient;

first 1st lag operation means for executing a 1st lag operation of the quotient and outputting a first 1st lag output;

second subtraction means for subtracting the first 1st lag output from the quotient and outputting a second difference;

third subtraction means for subtracting the first product from the setpoint value and outputting third difference;

fourth subtraction means for subtracting the first difference from the third difference and outputting a fourth difference;

second 1st lag operation means for executing a 1st lag operation of the fourth difference and outputting a second 1st lag output;

first addition means for adding the second 1st lag output and the second difference and outputting a first sum output; and second addition means for adding the first product and the first sum output and outputting the control setpoint value as a second sum.

14. A PID type two degrees of freedom controller comprising:

setpoint filter means for receiving a setpoint value, and outputting a control setpoint value, said setpoint filter means executing a calculation given by the following equation upon reception of the setpoint value, and obtaining the control setpoint value $SV_0$:

$$SV_0 = SV \cdot \frac{1 + \alpha\beta T_I \cdot S}{1 + \beta T_I \cdot S} + (SV \cdot \alpha \cdot \gamma - PV) \cdot \left(\frac{T_D \cdot S}{1 + \eta T_D \cdot S}\right) \cdot \left(\frac{\beta T_I \cdot S}{1 + \beta T_I \cdot S}\right) \quad (g)$$

where SV : a setpoint value, PV : a control value, $T_I$ : an integral time, $T_D$ : a derivative time, S : a Laplace operator, $\alpha$ : a constant which can be set between 0 and 1, $\beta$ : a constant which can be set between 0 and about 10, $\gamma$ : a constant which can be set between 0 and 2, and $\eta$ : a constant which can be set between 0.1 and 1;

deviation-calculating means for calculating a deviation between the control setpoint value and a control value fed back from a controlled system;

control operation means for receiving the deviation, executing at least a PI (P : proportional, I : integral) control operation, and outputting a manipulative variable; and means for applying the manipulative variable to the controlled system.

* * * * *